(12) United States Patent
Walker

(10) Patent No.: US 8,695,314 B2
(45) Date of Patent: Apr. 15, 2014

(54) TWO-WAY ACTION CABLE CONTROL ASSEMBLIES, SYSTEMS AND METHODS

(75) Inventor: Christopher Todd Walker, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 13/078,379

(22) Filed: Apr. 1, 2011

(65) Prior Publication Data

US 2012/0247261 A1    Oct. 4, 2012

(51) Int. Cl.
*A01D 69/00* (2006.01)
*B62D 51/04* (2006.01)

(52) U.S. Cl.
USPC .............................. 56/10.8; 56/11.3; 180/19.3

(58) Field of Classification Search
USPC .......... 74/488, 489, 502.2; 180/19.3; 56/10.8, 56/11.3, 11.4, 11.8, DIG. 8
See application file for complete search history.

(56) References Cited

U.S. PATENT DOCUMENTS

| | | | |
|---|---|---|---|
| 698,720 A | 4/1902 | Lowe | |
| 4,327,539 A * | 5/1982 | Bricko et al. | 56/113 |
| 4,335,566 A * | 6/1982 | Hurd | 56/11.8 |
| 4,363,206 A | 12/1982 | Schmitt | |
| 4,413,466 A * | 11/1983 | Beugelsdyk et al. | 56/11.3 |
| 5,701,967 A | 12/1997 | Bernard | |
| 5,784,868 A * | 7/1998 | Wadzinski et al. | 56/10.8 |
| 7,178,322 B2 * | 2/2007 | Osborne | 56/10.8 |
| 7,591,126 B2 | 9/2009 | Cox | |
| 7,644,781 B2 * | 1/2010 | Moriyama et al. | 172/350 |

* cited by examiner

*Primary Examiner* — Alicia Torres
(74) *Attorney, Agent, or Firm* — Jenkins, Wilson, Taylor & Hunt, P.A.

(57) ABSTRACT

Two-way action cable control assemblies, systems, and methods are provided. A two-step cable control assembly for a power machine can include a base member pivotably attached to a handle of a power machine and being movable between a disengaged position and an engaged position to actuate a machine component, a hand lever pivotably attached to the handle of the power machine, and a latch pivotably attached to the hand lever and movable into interlocking engagement with a portion of the base member. In this arrangement, the base member can be moved by the hand lever when the latch is interlocked with the base member.

20 Claims, 4 Drawing Sheets

TWO-WAY ACTION CABLE CONTROL ASSEMBLIES, SYSTEMS AND METHODS

TECHNICAL FIELD

The subject matter disclosed herein relates generally to a cable control assembly for walk-behind power machines. More particularly, the subject matter disclosed herein relates to two-way action cable control assemblies, systems and methods.

BACKGROUND

Power machines, particularly walk-behind power machines, often employ an operator control handle or bail to actively control a component of the power machine. In addition to providing a means of controlling the power machine, the control handle is often employed to enforce operator presence for safety reasons. For example, it is a requirement for some walk-behind power mowing machines such as for example tillers and lawnmowers to have a "dead man" control, which generally includes a spring-biased bail or other hand-gripped lever that can be grasped by the operator during normal operation of the machine to enable the motor of the machine. If the lever is thereafter released, the machine action is rapidly terminated for reasons of safety. In the case of a "dead man" control on a rotary tiller, for example, the engine and the rotating blades or tines are both rapidly stopped when the operator releases the lever.

In addition to the "dead, man" function, it is now further a requirement for many walk-behind power machines that control handles designed to enforce operator presence comprise a two-step apparatus such that a user must perform a two-step process before the blade can be engaged for rotation. Thus, a two-step control handle apparatus for a power machine would provide for operator control of the machine as well as conform to safety regulations.

SUMMARY

In accordance with this disclosure, novel two-way action cable control assemblies, systems and methods are provided. In one aspect, a two-step cable control assembly for a power machine is provided. The assembly can comprise a base member pivotably attached to a handle of a power machine and being movable between a disengaged position and an engaged position to actuate a machine component, a hand lever pivotably attached to the handle of the power machine, and a latch pivotably attached to the hand lever and movable into interlocking engagement with a portion of the base member. In this arrangement, the base member can be moved by the hand lever when the latch is interlocked with the base member.

In another aspect, a system for controlling a walk-behind power machine is provided and can comprise a handle attached to the walk-behind power machine and a two-step cable control assembly attached to the handle of the walk-behind mowing machine. The cable control assembly can itself comprise a case attached to the handle of the walk-behind mowing machine, a base member pivotably mounted to an interior surface of the case and being movable between a disengaged position and an engaged position to actuate a machine component, a hand lever pivotably attached to the handle of the walk-behind power machine, and a latch pivotably attached to the hand lever and movable into interlocking engagement with a portion of the base member. The base member can be moved by the hand lever when the latch is interlocked with the base member.

In another aspect, a method for controlling a power machine is provided. The method can comprise providing a two-step cable control assembly to a handle of a power machine. The assembly can comprise a base member pivotably attached to the handle of the power machine and can be movable between a disengaged position and an engaged position to actuate a machine component, a hand lever pivotably attached to the handle of the power machine, and a latch pivotably attached to the hand lever and movable into interlocking engagement with a portion of the base member. The method can further comprise moving the hand lever to a first position in which the latch is near the base member, moving the latch into interlocking engagement with a portion of the base member, and moving the hand lever to a second position, whereby the base member is moved to the engaged position.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides two-way action cable control assemblies, systems and methods. In one aspect, the present subject matter provides two-step cable control assembly for a power machine. The control can be sized to have substantially similar dimensions to current controls, and it can comprise a latching member that swings in the opposite direction of the hand lever, which can help to avoid accidental use. The control can be designed such that if the latching member fails, the entire assembly will fail.

Figure 1:
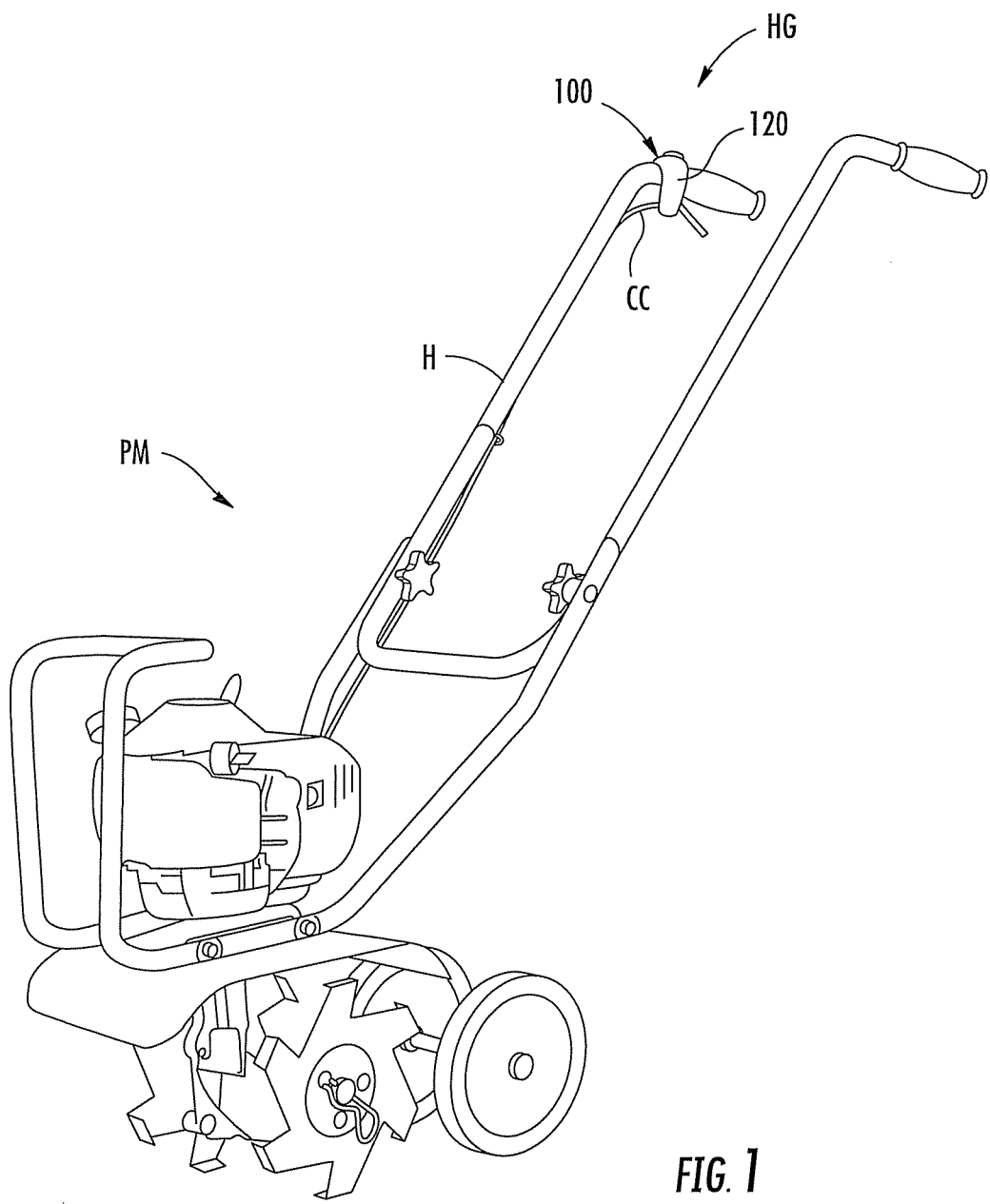
FIG. 1 is a perspective view of a power machine having a control assembly according to an embodiment of the presently disclosed subject matter.

Specifically, FIG. 1 illustrates a power machine, generally designated PM. In the embodiment shown in FIG. 1, for example, power machine PM can be a rotary tiller, but it is to be understood that power machine PM can comprise any suitable device or configuration generally known to persons skilled in the art or later developed. Regardless of the specific form of power machine PM, at least one handle, generally designated H, can be coupled to the rear portion of power machine PM by any suitable means, and can extend upwardly therefrom at an angle appropriate for comfortable grasping and manipulation by an operator. Handle H provides a hand grip area generally designated HG to be gripped by an operator that can be a section of handle H that is farthest away from the main operational components of power machine PM, such as a prime mover or motor.

As illustrated in FIG. 1, power machine PM can comprise a control assembly, generally designated 100, which can be used to communicate with a machine component, wherein the machine component can comprise an engine, transmission, blade brake clutch control, or the like as appreciated by those skilled in the art. Control assembly 100 can communicate with a machine component through a linking member, such as a control cable CC. Control cable CC can be any suitable elongate component, of cable or non-cable material, and can be either flexible or ridged and capable of transferring a force or actuation by translation and/or a change in tension. A non-limiting example of control cable CC is a cable, such as a Bowden wire, at least a portion of which is typically encased and extends through a coaxial sheath.

Control assembly 100 is shown in more detail in FIGS. 2A-2C, 3, and 4. As shown in these figures, control assembly 100 can comprise a base member 110 that can be pivotably attached to handle H of power machine PM. For example, base member 110 can be pivotable about a pivot point 112 shown in FIG. 2A. Base member 110 can be attached to control cable CC such that movement of base member 110 (e.g., rotation about pivot point 112) results in movement and actuation of control cable CC. More specifically, base member 110 can be pivoted between a disengaged position in which control cable CC is in an unactuated state (See, e.g., FIG. 2A) and an engaged position in which a force exerted on control cable CC causes the actuation of the connected machine component (See, e.g., FIG. 2C). Alternatively, rather than providing simple "OFF" and "ON" control, the movement of base member 110 can be configured to control a machine component having degrees of engagement. For instance, where the machine component is an engine throttle control, incremental movement of base member 110 away from the disengaged position can cause corresponding incremental increases in the power delivered by the engine.

Figure 3:
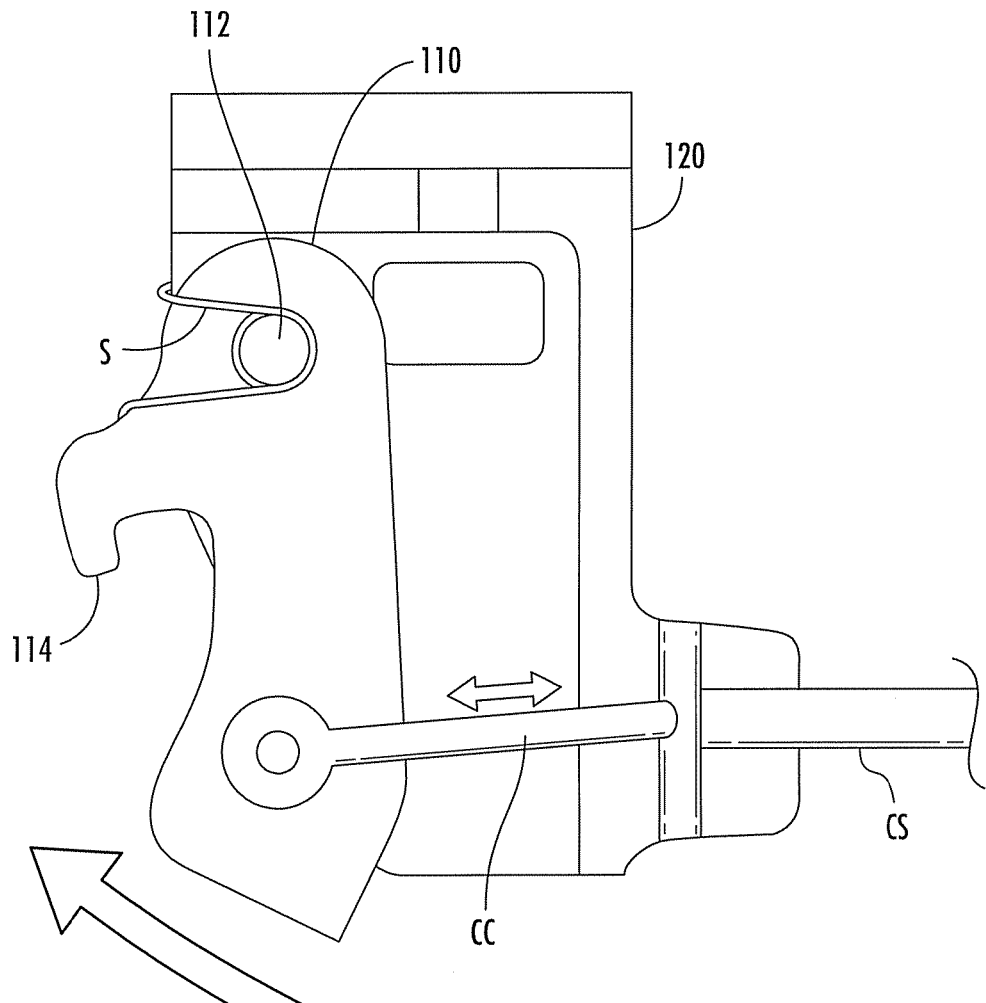
FIG. 3 is a side view of a base member of a control assembly according to an embodiment of the presently disclosed subject matter.
Figure 4:
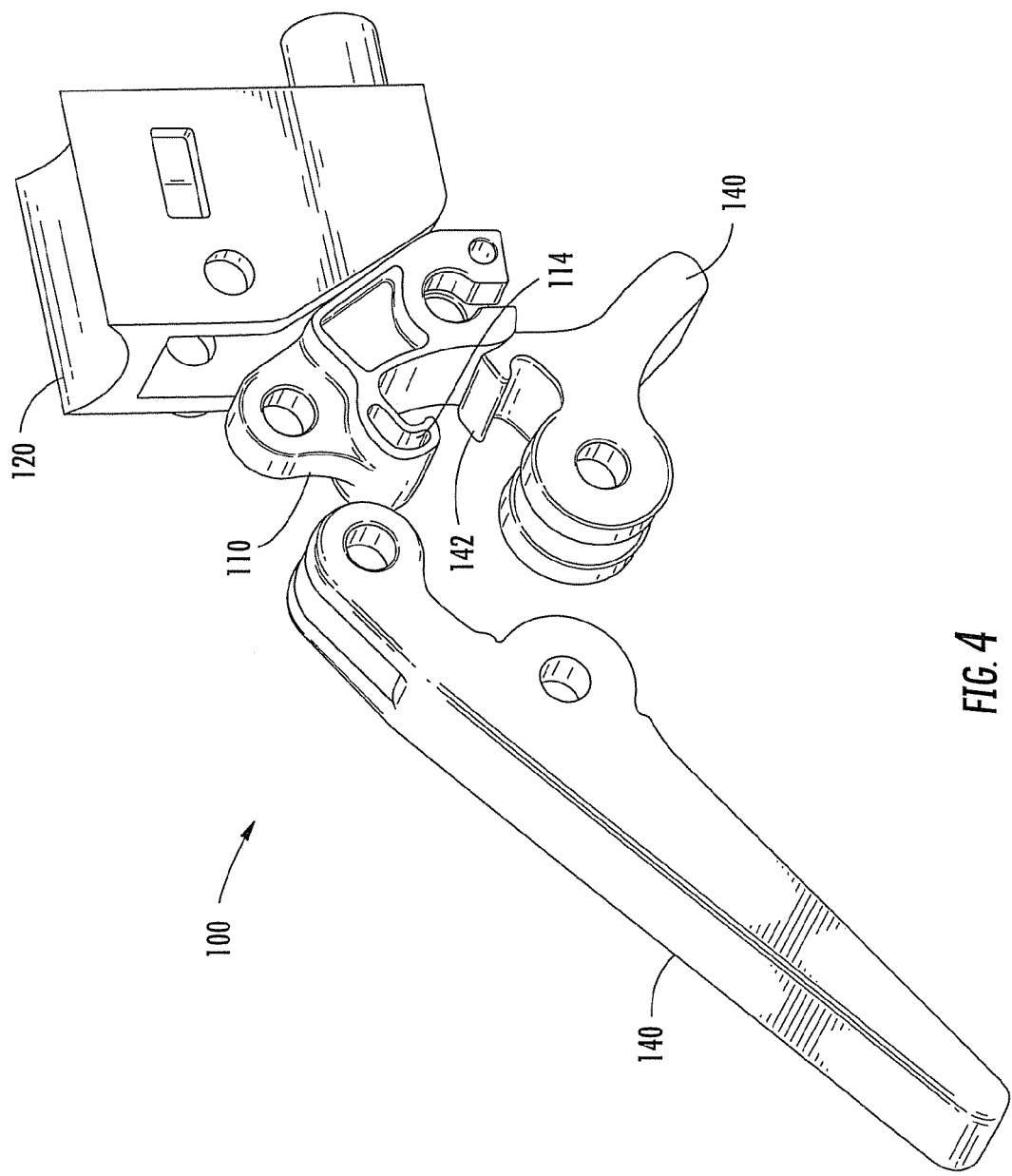
FIG. 4 is an exploded perspective view of a control assembly according to an embodiment of the presently disclosed subject matter.

For example, in this regard, control cable CC can be a Bowden wire as shown in FIG. 3. In this configuration, as base member 110 is moved from a disengaged position towards an engaged position, an exposed end of control cable CC can be pulled. Control cable CC can be connected to the machine control component at a second exposed end (not shown), with the intervening portion of control cable CC being contained within a coaxial sheath CS that can be maintained in a substantially fixed position, for example either within handle H or along an exterior surface of handle H or some other component of power machine PM.

As can further be seen in FIG. 3, a biasing mechanism, such as a spring element S, can be connected to base member 110 for biasing base member 110 toward the disengaged position to help fulfill the safety purpose of the dead man control. Alternatively, control cable CC could be biased at some point along its length to maintain a force that tends to pull base member 110 towards the disengaged position. As another example, a biasing force could be applied to the machine component and transferred through control cable CC to yield the same result. In this way, if the operator does not apply a sufficient force to move base member 110 towards the engaged position, the biasing mechanism can operate to move the machine component to a disengaged state. The design of base member 110 and/or the biasing mechanism can be selected, however, such that only a low holding force can be required to maintain the activation of the machine component.

To further help deter inadvertent actuation of control cable CC, base member 110 can be at least partially surrounded by a case 120. For instance, case 120 can be mounted on handle H, and base member 110 can be pivotably mounted within case 120 (e.g., pivot point 112 can be located on an interior surface of case 120). Case 120 can be sized to have substantially the same dimensions as control handles that are currently used in the control art. For example, case 120 can have a case length d (shown for example in FIG. 2C) that can be substantially the same dimension as control handles that are currently used (e.g., about 40 mm). This similar sizing can be advantageous in adapting current machine designs to incorporate control assembly 100.

With base member 110 being at least partially enshrouded by case 120, a separate element can be used to cause rotation of base member 110. For instance, as shown in FIGS. 2A-2C and 3, a hand lever 130 can be pivotably attached to handle H. In the configuration shown in the figures, for example, hand lever 130 can also be pivotable about pivot point 112, although it should be understood that control assembly 100 can be operable if base member 110 and hand lever 130 rotate about different pivot points. Hand lever 130 can be a squeeze-trigger-style lever that is commonly used in the art as a throttle control. Hand lever 130 can be pivoted between a first position shown in FIG. 2A and a second position shown in FIG. 2C. Much like base member 110 can be biased towards the disengaged position, hand lever 130 can be biased towards the first position.

To couple the movement of hand lever 130 to base member 110, a latch 140 can be pivotably attached to hand lever 130, such as about a latch pivot 132. Latch 140 can be movable into interlocking engagement with at least a portion of base member 110 to thereby couple the movement of hand lever 130 with the movement of base member 110. More specifically, for example, base member 110 can comprise a base projection 114, and latch 140 can comprise a latch projection 142 that can be complementarily shaped to base projection 114. For example, as shown in FIGS. 2A-2C and 3, base projection 114 and latch projection 142 can each have a substantially hook-shaped profile, and the hook-shaped profiles can oppose each other such that they can interlock when latch projection 142 is moved into a position abutting base projection 114.

When hand lever 130 is in the first position, latch 140 can be moved toward base member 110 such that latch projection 142 interlocks with base projection 114 of base member 110. From this position, if hand lever 130 is moved towards the second position, the interconnection of latch 140 with base member 110 can allow the motion of hand lever 130 to cause base member 110 to pivot towards the engaged position.

In this arrangement, a two-stage actuation procedure can be followed to cause the actuation of the machine component. First, with hand lever 130 in the first position, latch 140 can be pivoted towards base member 110 such that latch projection 142 abuts base projection 114. With latch projection 142 engaged with base projection 114, hand lever 130 can be moved towards the second position, whereby the coupling of latch 140 with base member 110 (via engagement of latch projection 142 with base projection 114) causes this movement of hand lever 130 to result in the movement of base member 110 towards the engaged position. Further, the coupling of hand lever 130 to base member 110 by way of latch 140 can be maintained until hand lever 130 is returned to the first position.

Figure 2C:
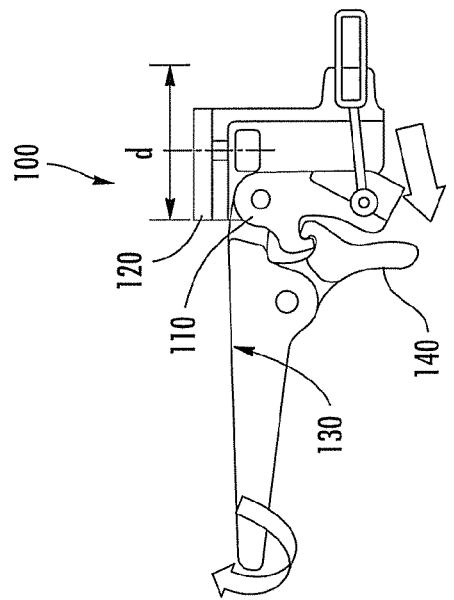
FIG. 2C is a side cutaway view of a control assembly in an engaged state according to an embodiment of the presently disclosed subject matter.
Figure 2B:
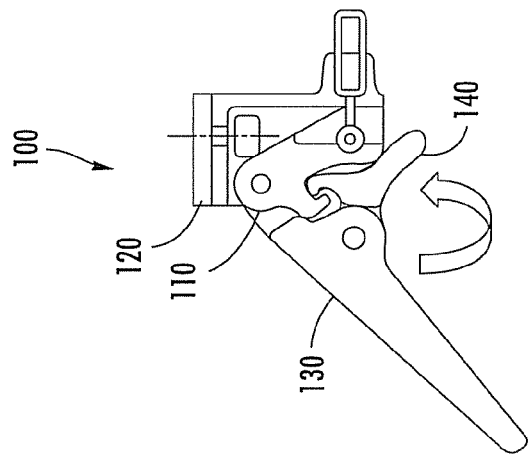
FIG. 2B is a side cutaway view of a control assembly in a first stage of a two-stage engagement process according to an embodiment of the presently disclosed subject matter.
Figure 2A:
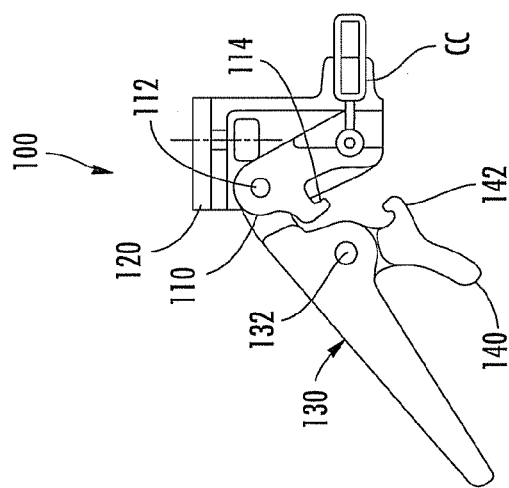
FIG. 2A is a side cutaway view of a control assembly in a disengaged state according to an embodiment of the presently disclosed subject matter.

As can be seen in FIGS. 2A-2C, control assembly 100 can be configured such that latch 140 has to be moved in a direction that is different than the direction base member 110 is moved from the disengaged position to the engaged position. More specifically, for example, as shown in FIG. 2B, latch 140 can be moved in a first direction (e.g., counter-clockwise in FIG. 2B) for latch projection 142 to engage base projection 114. In contrast, as shown in FIG. 2C, hand lever 130 is moved in a substantially opposing direction (e.g., clockwise in FIG. 2C) from the first position to the second position. In this manner, the requirement for two distinct, opposing motions being needed to cause the actuation of the machine component via control assembly 100 can help to prevent accidental engagement of the machine component.

It should be understood that with the configuration for control assembly 100 discussed above, should latch 140 fail (i.e., break), hand lever 130 can be unable to couple with base member 110, thereby rendering control assembly 100 inoperable. This failsafe feature of control assembly 100 can help to ensure that the two-stage engagement procedure cannot be easily bypassed or disabled.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A two-step cable control assembly for a power machine, comprising:
   a base member pivotably movable on power machine, the base member being movable between a disengaged position and an engaged position to actuate a machine component;
   a hand lever pivotably movable on the power machine between a first angular position and a second angular position, the hand lever comprising a first end connected to the power machine at a pivot point and a second end opposite the first end that is configured to be gripped by an operator; and
   a latch pivotably attached to the hand lever at a latch pivot positioned on the hand lever between the pivot point and the second end, wherein the latch is positioned between the base member and the second end of the hand lever;
   wherein, when the hand lever is in the first angular position, the latch is selectively movable relative to the hand lever by the operator into interlocking engagement with a portion of the base member; and
   wherein the base member is movable by the hand lever when the latch is interlocked with the base member and the hand lever is moved toward the second angular position.

2. The assembly of claim 1, wherein the power machine is a walk-behind mowing machine.

3. The assembly of claim 1, wherein the machine component is a machine throttle.

4. The assembly of claim 1, wherein the base member is operatively connected to the machine component through a linking member.

5. The assembly of claim 4, wherein the linking member comprises a control cable.

6. The assembly of claim 1, wherein the base member and the hand lever are pivotable about the pivot point.

7. The assembly of claim 1, wherein the base member comprises a base projection; and
   wherein the latch comprises a latch projection that is shaped complementarily to the base projection for interlocking with the base projection.

8. The assembly of claim 7, wherein the base projection and the latch projection each have a substantially hook-shaped profile.

9. The assembly of claim 1, comprising a case at least partially surrounding the base member.

10. The assembly of claim 1, comprising a biasing mechanism for biasing the base member towards the disengaged position.

11. The assembly of claim 10, wherein the biasing mechanism comprises a spring.

12. A system for controlling a walk-behind power machine, the system comprising:
    a handle attached to a walk-behind power machine; and
    a two-step cable control assembly attached to the handle of the walk-behind mowing machine, the cable control assembly comprising:
    a case attached to the handle of the walk-behind mowing machine;
    a base member pivotably mounted to an interior surface of the case and being movable between a disengaged position and an engaged position to actuate a machine component;
    a hand lever pivotably attached to the handle of the walk-behind power machine for movement between a first angular position and a second angular position, the hand lever comprising a first end connected to the power machine at a pivot point and a second end opposite the first end that is configured to be gripped by an operator; and
    a latch pivotably attached to the hand lever at a latch pivot positioned on the hand lever between the pivot point and the second end, wherein the latch is positioned between the base member and the second end of the hand lever;
    wherein, when the hand lever is in the first angular position, the latch is selectively movable relative to the hand lever by the operator into interlocking engagement with a portion of the base member; and
    wherein the base member is movable by the hand lever when the latch is interlocked with the base member and the hand lever is moved toward the second angular position.

13. The system of claim 12, wherein the walk-behind power machine is a rotary tiller and the machine component is a tiller blade.

14. The system of claim 12, wherein the base member is operatively connected to the machine component through a linking member.

15. The system of claim 14, wherein the linking member comprises a control cable.

16. The system of claim 12, wherein the base member and the hand lever are pivotable about a common pivot point.

17. The system of claim 12, wherein the base member comprises a base projection; and
    wherein the latch comprises a latch projection that is shaped complementarily to the base projection for interlocking with the base projection.

18. The system of claim 12, comprising a biasing mechanism for biasing the base member towards the disengaged position.

19. A method for controlling a power machine, comprising:
   providing a two-step cable control assembly to a power machine, the assembly comprising:
      a base member pivotably movable on the power machine between a disengaged position and an engaged position to actuate a machine component;
      a hand lever pivotably movable on the power machine; and
      a latch pivotably attached to the hand lever and movable into interlocking engagement with a portion of the base member;
   moving the hand lever to a first position in which the latch is near but out of contact with the base member;
   while the hand lever is held in the first position, manually pivoting the latch with respect to the hand lever towards the base member and into interlocking engagement with a portion of the base member; and
   moving the hand lever to a second position, whereby the base member is moved to the engaged position.

20. The method of claim 19, wherein moving the latch into interlocking engagement with a portion of the base member comprises moving the latch in a first direction; and
   wherein moving the hand lever to the second position comprises moving the hand lever in a second direction, the second direction being substantially opposite the first direction.

* * * * *